(12) United States Patent
Reischl et al.

(10) Patent No.: US 7,485,819 B2
(45) Date of Patent: Feb. 3, 2009

(54) STEERING COLUMN SWITCH

(75) Inventors: Erik Reischl, Birkenfeld (DE); Peter Leng, Mainz (DE); Klaus Schnell, Appenheim (DE); Joachim Koehler, Biebelsheim (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/810,310

(22) Filed: Jun. 5, 2007

(65) Prior Publication Data
US 2008/0029370 A1 Feb. 7, 2008

(30) Foreign Application Priority Data
Jul. 7, 2006 (EP) .................... 06014090

(51) Int. Cl.
*H01H 9/00* (2006.01)
(52) U.S. Cl. ................. 200/61.54; 200/61.27
(58) Field of Classification Search ........... 200/61.54
See application file for complete search history.

(56) References Cited
U.S. PATENT DOCUMENTS
6,020,563 A * 2/2000 Risk et al. ............. 200/61.54
6,518,524 B1 * 2/2003 Brandt et al. ........... 200/61.54
6,548,773 B2 * 4/2003 Matsumoto et al. ...... 200/61.54
6,566,616 B1 * 5/2003 Ha ...................... 200/61.54

FOREIGN PATENT DOCUMENTS

| DE | 43 28 427 | 3/1995 |
|---|---|---|
| DE | 298 12 227 | 10/1998 |
| DE | 299 01 614 | 4/1999 |
| DE | 198 08 665 | 8/1999 |
| EP | 0 939 008 | 9/1999 |
| EP | 1 207 076 | 5/2002 |

OTHER PUBLICATIONS

EP Search Report dated Oct. 24, 2006.

\* cited by examiner

*Primary Examiner*—Elvin G Enad
*Assistant Examiner*—Lheiren Mae A Anglo
(74) *Attorney, Agent, or Firm*—Jimmy L. Funke

(57) ABSTRACT

A steering column switch, especially for a motor vehicle, contains a switch lever, which is activated transversely and which has a magnetic signal transmitter, to which several stationary magnetic-field sensors coupled to an evaluation unit are allocated for determining the switch positions of the switch lever. The switch lever supports a rotary switch and the signal transmitter and also the magnetic-field sensors are used for determining the switch positions of the rotary switch.

18 Claims, 1 Drawing Sheet

STEERING COLUMN SWITCH

TECHNICAL FIELD

The invention relates to a steering column switch, especially for a motor vehicle, with a switch lever, which is activated transversely and which has a magnetic signal transmitter, to which several stationary magnetic-field sensors coupled to an evaluation unit are allocated for determining the switch positions of the switch lever.

BACKGROUND OF THE INVENTION

DE 299 01 614 U1 discloses an electric switch for contact-less switching with a movable switch lever, to which is allocated a switching arm which has a magnetosensitive switch-position detection device and which is guided in a switch tack to produce a switching feel in each of the individual switch positions that is characterized by a perceptible engagement. The switch position detection device includes a magnetic signal transmitter coupled to the switch movement of the switching arm and a converter arrangement, which is stationary relative to the movement of the magnetic signal transmitter and which is composed of individual magnetoelectric converters connected to an evaluation unit. The switching arm engages with two functional and separated modules, wherein one module is a switch track, in which the switching arm engages and in which the switching arm is guided, and the other module is the switch detection device with the signal transmitter moving with the movement of the switching arm. The magnetic signal transmitter is coupled in an articulated way to the movement of the switching arm, such that a rotational movement of the switching arm results in a translating movement of the signal transmitter. Here the signal transmitter is constructed as a coded magnetic plate, whose coding is formed by several, differently magnetized tracks running parallel to each other in the movement direction of the signal transmitter and the electromagnetic converters of the converter arrangement are constructed for detecting these tracks. This switch is disadvantageous in the respect that it has a relatively complicated design.

In addition, DE 298 12 227 U1 shows a device for detecting switch positions of a switch that can be activated mechanically with a guided switch element, which is held fixed in the different given switch positions. The device includes a signal transmitter allocated to the switch element and a number of sensing units corresponding to the number of switch positions to be detected, wherein one sensing unit is allocated to each switch position to be detected in an arrangement, such that in a switch position to be detected, the signals emerging from the signal transmitter are detected by the sensing unit allocated to this switch position.

SUMMARY OF THE INVENTION

The problem of the invention is to devise a steering column switch of the type named above, which features a simple and economical design.

According to the invention, the problem is solved in that the switch lever supports a rotary switch and the signal transmitter and also the magnetic-field sensors are used for determining the switch positions of the rotary switch.

Thus, both for transverse force acting on the switch lever and also for a rotational activation of the rotary switch, contact-less switching is realized, wherein it is not necessary to support the signal transmitter in an articulating way as described in the state of the art. The position of the signal transmitter relative to the magnetic-field sensors, of which, for example, two are presented, is determined accordingly both by the switch lever and also by the rotary switch supported therein and the evaluation unit determines the assumed switch position from the different possible positions.

For a structurally simple realization of the steering column switch, the switch lever preferably has, in its interior, a switch shaft, whose end facing the magnetic-field sensors carries the signal transmitter, wherein the switch shaft is locked in rotation with an activation ring of the rotary switch supported in the switch lever.

Alternatively, the problem is solved according to the invention in that the switch lever includes a push-button switch and the signal transmitter and also the magnetic-field sensors are used for determining the switch positions of the push-button switch.

Due to these measures, both for a transverse force applied to the switch lever and also for a pressed or lockable pressure activation of the push-button switch, contact-less switching is realized. The position of the signal transmitter relative to the magnetic-field sensors is determined, first, by the corresponding switch position of the switch lever and, second, by the switch position of the push-button switch. From the different possible positions of the signal transmitter relative to the magnetic-field sensors, the evaluation unit determines the current switch position.

Preferably, the switch axis is fixed to an activation element of the push-button switch arranged on the free end of the switch lever. Accordingly, it is possible, without additional means, to allocate the switch shaft both to the rotary switch and also to the push-button switch, which is contained explicitly in the scope of the invention. In one such construction, the switch shaft is locked in rotation but displaceable relative to the rotary switch and fixed in the axial direction relative to the push-button switch or its corresponding activation elements, wherein it is obviously also possible to support the entire switch lever or the annular activation element of the rotary switch displaceable in the axial direction, in order to realize a push-button switch.

To implement the signal transmission representing the different switch positions, preferably the signal transmitter is constructed as a permanent magnet with a cylindrical cross section, whose longitudinal axis is not aligned parallel to the switch shaft. Preferably, the dipolar permanent magnet has poles of different sign along its longitudinal halves. Preferably, the permanent magnet and a sensor array containing the magnetic-field sensors are aligned relative to each other, such that a free end of the permanent magnet runs essentially parallel to the sensor field. Thus, the magnetic-field sensors unambiguously detect signals of the permanent magnet allocated to one switch position. Obviously, the free end of the permanent magnet is not aligned exactly parallel to the sensor array in all of the switch positions, but instead describes a circular track, which can deviate slightly from the parallel alignment.

For realizing a compact construction, advantageously, the permanent magnet and the sensor array are arranged in a fork-shaped free space of the switch lever, with connects to a foot allocated to the switch lever with a locking sleeve acting on a housing-side locking cam. Preferably, the magnetic-field sensors are designed for detecting rotational movements of the permanent magnet and the evaluation electronics are designed for detecting the pivoting movements.

It is understood that the features named above and still to be explained below can be used not only in the specified combination, but also in other combinations. The scope of the invention is defined only by the claims.

BRIEF DESCRIPTION OF THE DRAWINGS

The invention is explained in more detail below using an embodiment with reference to the associated drawings. Shown are.

DESCRIPTION OF THE PREFERRED EMBODIMENTS

Figure 1:
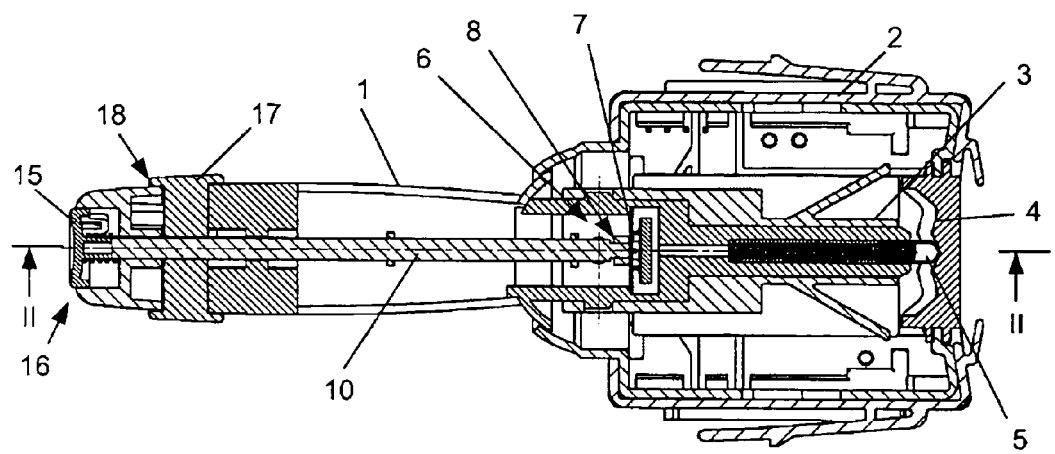
FIG. 1, a section view of a steering column switch according to the invention, FIG. 2, a section view of the steering column switch along line II-II from FIG. 1, and FIG. 3, an enlarged schematic view of detail III from FIG. 2.
Figure 2:
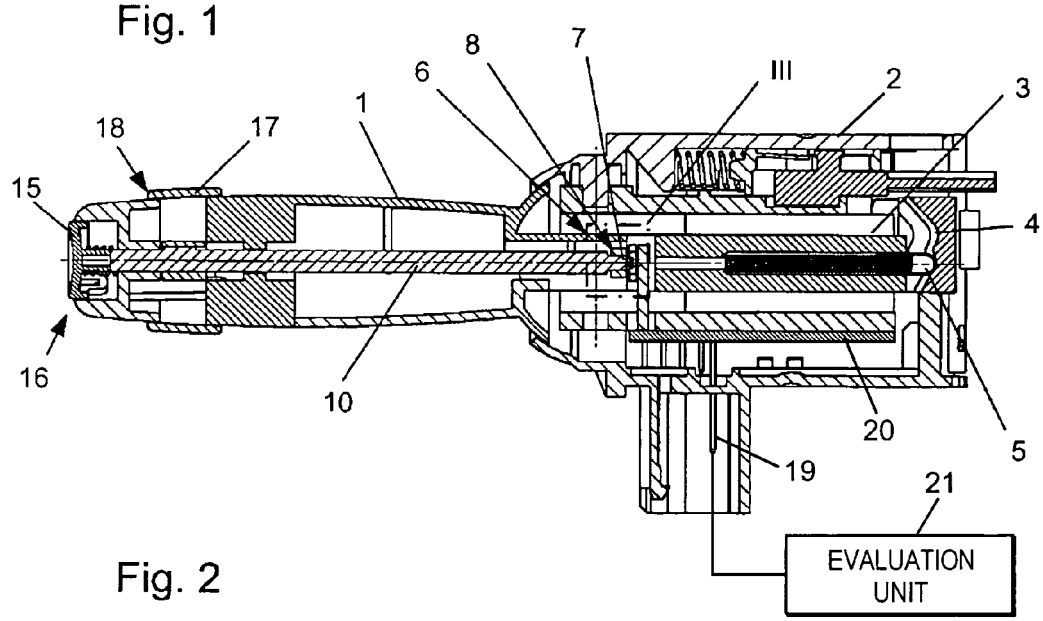
Figure 3:
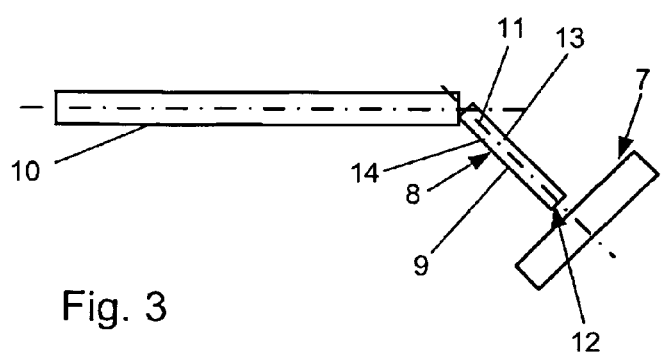

The steering column switch comprises a switch lever 1, which is inserted into a foot 3 supported in a housing 2. The foot 3 of the switch lever 1 that can pivot transversely has, on its free end, a locking sleeve 5 interacting with a locking cam 4. In the coupling region of the foot 3 with the switch lever 1 there is a free space 6, in which there is a sensor array 7 containing at least two magnetic-field sensors and a magnetic signal transmitter 8, which interacts with these sensors and which is constructed as a permanent magnet 9. The cylindrical permanent magnet 9 is fixed to one end of a switch shaft 10 supported in the switch lever 1, such that its longitudinal axis 11 is not parallel to the switch shaft 10 and its free end face 12 is aligned relative to the sensor array 7. The dipolar permanent magnet 9 has poles of different sign along its longitudinal halves 13, 14. The switch shaft 10 is connected, with its end opposite the permanent magnet 9, to an activation element 15 of a push-button switch 16, which is arranged in the free end of the switch lever 1. In addition, the switch shaft 10 is locked in rotation with an activation ring 17 of a rotary switch 18 supported rotatably in the switch lever 1.

For a pivoting movement of the switch lever 1 into one of its pressed or locked switch positions arranged transverse to each other and for pressure applied to the activation element 15 of the push-button switch 16 and also a rotating force on the activation ring 17 of the rotary switch 18, the position of the permanent magnet 9 changes relative to the magnetic-field sensors of the sensor array 7. The magnetic-field sensors coupled to a circuit board 20 provided with contacts 19 transmit the corresponding signals to an evaluation unit 21, which can be a component of the steering column switch, or which can be integrated into the onboard electronics of a motor vehicle.

The invention claimed is:

1. A steering column switch, especially for a motor vehicle, comprising a switch lever, which is activated transversely and which has a magnetic signal transmitter, to which are allocated several stationary magnetic-field sensors coupled to an evaluation unit for determining the switch positions of the switch lever, wherein the switch lever supports a rotary switch and the signal transmitter and also the magnetic-field sensors are used for determining the switch positions of the rotary switch, wherein the switch lever has, in its interior, a switch shaft, whose end facing the magnetic-field sensors carries the signal transmitter, wherein the switch shaft is locked in rotation with an activation ring of the rotary switch supported in the switch lever.

2. The steering column switch of claim 1, wherein the switch lever contains a push-button switch and the signal transmitter and also the magnetic-field sensors are used for determining the switch positions of the push-button switch.

3. The steering column switch of claim 1, wherein the switch shaft is fixed to an activation element of a push-button switch arranged on the free end of the switch lever.

4. The steering column switch of claim 1, wherein the signal transmitter is constructed as a permanent magnet with a cylindrical cross section, whose longitudinal axis is aligned not parallel to the switch shaft.

5. The steering column switch of claim 1, wherein the signal transmitter comprises a permanent magnet and a sensor array containing the magnetic-field sensors are aligned relative to each other, such that a free end of the permanent magnet runs essentially parallel to the sensor array.

6. The steering column switch of claim 1, wherein the magnetic-field sensors are designed for detecting rotational movements of the permanent magnet and the evaluation unit is designed for detecting the pivoting movements.

7. A steering column switch, especially for a motor vehicle, comprising a switch lever, which is activated transversely and which has a magnetic signal transmitter, to which are allocated several stationary magnetic-field sensors coupled to an evaluation unit in an array for determining the switch positions of the switch lever, wherein the switch lever supports a rotary switch and the signal transmitter and also the magnetic-field sensors are used for determining the switch positions of the rotary switch, wherein the signal transmitter is constructed as a dipolar permanent magnet having poles of different sign along its longitudinal halves.

8. The steering column switch of claim 7, wherein the switch lever contains a push-button switch and the signal transmitter and also the magnetic-field sensors are used for determining the switch positions of the push-button switch.

9. The steering column switch of claim 7, wherein the switch shaft is fixed to an activation element of a push-button switch arranged on the free end of the switch lever.

10. The steering column switch of claim 7, wherein the signal transmitter is constructed as a permanent magnet with a cylindrical cross section, whose longitudinal axis is aligned not parallel to the switch shaft.

11. The steering column switch of claims 7, wherein the signal transmitter comprises a permanent magnet and a sensor array containing the magnetic-field sensors are aligned relative to each other, such that a free end of the permanent magnet runs essentially parallel to the sensor array.

12. The steering column switch of claim 7, wherein the magnetic-field sensors are designed for detecting rotational movements of the permanent magnet and the evaluation unit is designed for detecting the pivoting movements.

13. A steering column switch, especially for a motor vehicle, comprising a switch lever, which is activated transversely and which has a magnetic signal transmitter, to which are allocated several stationary magnetic-field sensors coupled to an evaluation unit in an array for determining the switch positions of the switch lever, wherein the switch lever supports a rotary switch and the signal transmitter and also the magnetic-field sensors are used for determining the switch positions of the rotary switch, wherein the signal transmitter comprises permanent magnet arranged with the sensor array in a fork-shaped free space of the switch lever, which connects to a foot allocated to the switch lever with a locking sleeve acting on a housing-side locking cam.

14. The steering column switch of claim 13, wherein the switch lever contains a push-button switch and the signal transmitter and also the magnetic-field sensors are used for determining the switch positions of the push-button switch.

15. The steering column switch of claim 13, wherein the switch shaft is fixed to an activation element of a push-button switch arranged on the free end of the switch lever.

16. The steering column switch of claim 13, wherein the signal transmitter is constructed as a permanent magnet with a cylindrical cross section, whose longitudinal axis is aligned not parallel to the switch shaft.

17. The steering column switch of claims 13, wherein the signal transmitter comprises a permanent magnet and a sensor array containing the magnetic-field sensors are aligned relative to each other, such that a free end of the permanent magnet runs essentially parallel to the sensor array.

18. The steering column switch of claim 13, wherein the magnetic-field sensors are designed for detecting rotational movements of the permanent magnet and the evaluation unit is designed for detecting the pivoting movements.

\* \* \* \* \*